United States Patent [19]

Patsko

[11] 4,151,854
[45] May 1, 1979

[54] METHOD AND APPARATUS FOR MIXING AND SUPPLYING FOUNTAIN SOLUTION TO PRINTING PRESSES

[75] Inventor: Robert J. Patsko, Prairie Village, Kans.

[73] Assignee: Inland Newspaper Machinery Corporation, Lenexa, Kans.

[21] Appl. No.: 827,629

[22] Filed: Aug. 25, 1977

[51] Int. Cl.² ............................................. F16K 19/00
[52] U.S. Cl. ...................................... 137/3; 137/389; 137/606; 137/624.11
[58] Field of Search ................ 137/3, 93, 101.25, 389, 137/606, 624.11

[56] References Cited

U.S. PATENT DOCUMENTS

| | | | |
|---|---|---|---|
| 3,605,783 | 9/1971 | Pecker | 137/3 X |
| 3,823,728 | 7/1974 | Burris | 137/101.25 X |
| 3,870,076 | 3/1975 | Graznak | 137/3 X |

*Primary Examiner*—Robert G. Nilson
*Attorney, Agent, or Firm*—Schmidt, Johnson, Hovey & Williams

[57] ABSTRACT

A process control system especially adapted for mixing and supplying fountain solution to printing press apparatus obviates the need for mechanical float metering devices and scale mechanisms heretofore used for mixing of liquid solution ingredients in prescribed ratios, by providing an electrical circuit control system for measuring the quantity of liquid ingredients to be mixed and for controlling the sequence in which the ingredients are transferred between a plurality of mixing and holding tanks. A selectively variable time base is correlated with the quantity of a primary liquid ingredient introduced to a mixing tank and an electrical sensing device is operative to detect the presence of a quantity of fountain solution within the tank corresponding to a batch thereof. A proportionate relationship is established between the time correlated quantity of the primary ingredient, the quantity of the fountain solution detected by the sensing device, and the quantity of a secondary liquid ingredient introduced to the mixing tank, whereby to precisely preestablish the ratio of the primary ingredient to the secondary ingredient present in each batch of the solution transferred from the mixing tank to a holding reservoir. A series of valves interconnecting the mixing and holding tanks are selectively actuated by the control system to achieve continuous, automatic mixing, and transfer to the holding reservoir of successive batches of the fountain solution, in order to constantly replenish the holding reservoir, as fountain solution supplied to the printing presses from the reservoir is gradually depleted.

20 Claims, 2 Drawing Figures

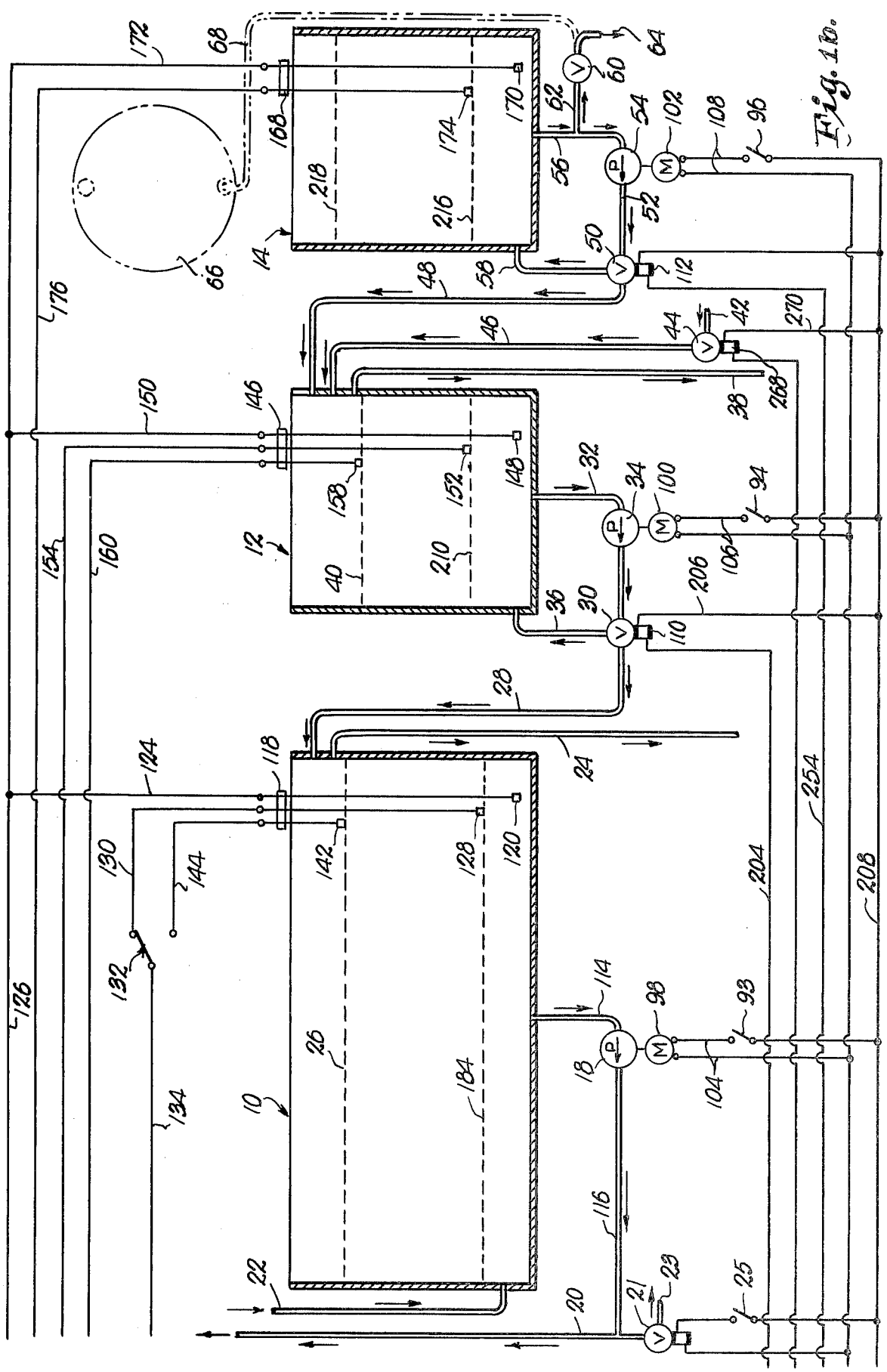

METHOD AND APPARATUS FOR MIXING AND SUPPLYING FOUNTAIN SOLUTION TO PRINTING PRESSES

BACKGROUND AND BRIEF DESCRIPTION OF THE INVENTION

This invention generally relates to a process control system for mixing and supplying liquids, and deals more particularly with novel improvements in a water fountain mixing and supply system suitable for use in connection with printing press apparatus or the like.

The lithographic printing process produces an inked impression by means of a selectively inked lithographic plate which includes image areas defined by greasy or resinous portions which are adherent to ink. The nonimage areas on the plate, which represent the blank spaces of the printed product, are maintained in a dampened or moist condition during the printing operation by means of a fountain solution which is applied to the plate. The fountain solution, which comprises a carefully proportioned mixture of water and a chemical concentrate such as gum, acid, or alkaline etchant, rejects the ink from non-image areas. Thus, when an ink charged roller is passed over the plate, the ink adheres to the image portions and is rejected by the dampened nonimage areas to reproduce the desired image.

Known dampening systems for applying the fountain solution during the printing operation are usually of the type in which the solution is continuously circulated between a remotely located reservoir of such solution, and various applicator means which are located adjacent to the printing plates. As the fountain solution is consumed during the dampening operation and solution is depleted from the reservoir, fresh quantities of the solution must be mixed and successively transferred to the reservoir to replenish the latter. Prior art dampening systems typically employ a mixing compartment adjacent the reservoir, wherein measured quantities of water and a chemical concentrate are combined in a specific ratio to produce "batches" of the specially formulated solution for subsequent transfer to the reservoir. Because numerous factors tend to affect the fountain solution ratio, such as relative humidity, the type of printing plate being used, the ratio of image to background area, etc., means are normally provided in the dampening system for selectively varying the ratio of chemical concentrate to water with a relatively high degree of precision.

Due to the above mentioned requirements, prior art systems, such as that disclosed in U.S. Pat. No. 3,893,470, devised for mixing and supplying fountain solution have been rather complicated in structure and have resorted to float metering devices, mechanical scale assemblies and the like for providing the portioning and mixing functions. These prior art systems, which are primarily mechanical in their design, are less than completely satisfactory in several respects; the moving mechanical components of these systems are subject to wear with use which, in turn, eventually diminishes the mixing accuracy and repeatability of the system. Moreover, float devices employed in the prior art apparatus sometimes became "stuck" for any of various reasons, and therefore further contributed to the lack of reliability of these previous mechanical type mixing systems.

The present invention represents a significant advancement in the art by providing a fountain solution mixing and supplying apparatus which is not only extremely reliable, but also provides very precise proportioning of the mixed liquid ingredients with consistently repeatable results. According to the present invention, supplies of a chemical concentrate and water and respectively delivered to a mixing tank through a pair of selectively actuated valve means, wherein successive batches of the fountain solution are mixed and then transferred through a third selectively actuated valve means to a reservoir from which the fountain solution is circulated to the printing press for use. An electrical circuit control system controls the operation of each of the valve means and includes electrical means for sensing the quantities of fountain solution in both the mixing tank and the reservoir, and also includes selectively adjustable timing means for correlating the amount of chemical concentrate which is introduced into the mixing tank. After a correlated quantity of the concentrate has been introduced into the tank, the control system functions to add a quantity of water to the mixing tank in order to produce a batch of the fountain solution having the proper concentrate to water ratio. Upon sensing that a prescribed quantity of the fountain solution has been depleted from the reservoir, the control system actuates valve means to effect the transfer of an already mixed batch of the solution from the mixing tank to the reservoir whereby to replenish the latter. As a further feature of the invention, a tank for holding a supply of the chemical concentrate is coupled with the mixing tank through further selectively actuatable valve means to allow delivery of the concentrate to the mixing tank in accordance with the operation of the control system.

The primary object of the invention is to provide a system for mixing and supplying a formulated liquid solution, which employs an electrical control circuit for precisely measuring the quantities of the ingredients comprising the solution, whereby to mix the same in a pre-selected ratio to produce a batch of the formulated solution. In connection with the foregoing object, it is a further object of the invention to provide a system of the mentioned type which correlates the quantity of at least one ingredient used in the batch with a selectively variable time base.

Another object of the invention is to provide a system of the mentioned type wherein electrical sensing means are employed to detect the production of a quantity of the liquid formulation corresponding to a batch thereof.

A further object of the invention is to provide apparatus in a system of the type described which includes a plurality of valve connected liquid containers wherein the valves are responsive to an electrical control system to effect the transfer of liquids therebetween, for mixing and supplying the solution.

Other and further objects of the invention will be made clear or become apparent in the course of the following description of a preferred embodiment of the invention.

DETAILED DESCRIPTION OF THE INVENTION

Figure 1A:
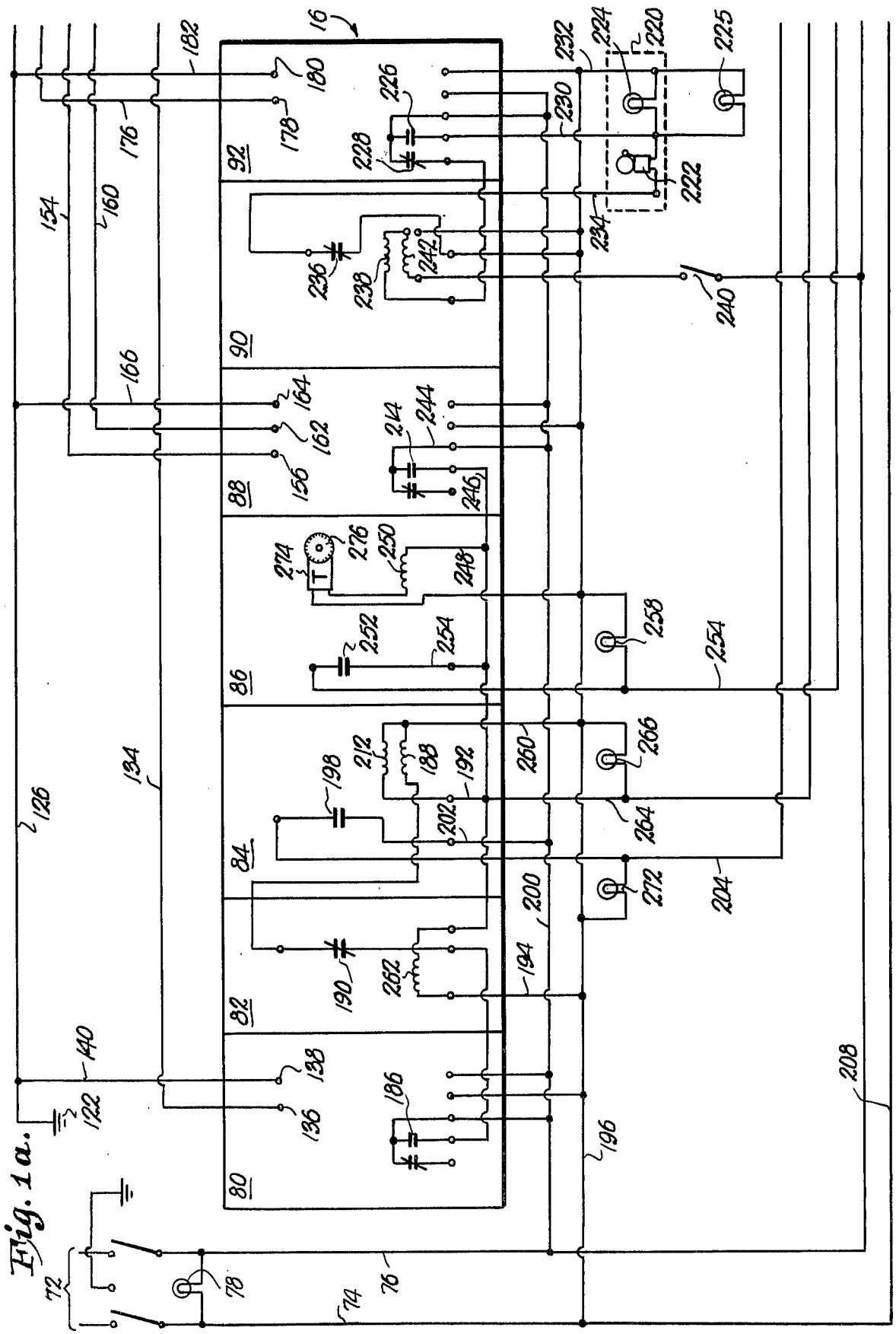

In the accompanying drawings:

FIGS. 1A and 1B taken in conjunction with each other form a combined schematic and diagramatic representation of a system for mixing and supplying a fountain solution which comprises the present invention.

Referring now to the drawings, a fountain solution mixing and supplying system broadly comprises a reservoir 10, mixing tank 12, concentrate supply tank 14 and an electrical control system panel generally designated by the numeral 16. Reservoir 10 is adapted to hold a quantity of a fountain solution which is caused to be delivered by means of pump 18 through supply line 20 to dampening means (not shown) associated with printing press apparatus (not shown). A solenoid actuated valve 21 may be selectively actuated by means of switch 25 to divert the flow of solution from line 20 to the drain 23, in order to evacuate the reservoir 10. Excess fountain solution not used by the dampening means is returned from the latter to the reservoir 10 via return line 22. An overflow line 24 is in communication with the reservoir 10 above the upper liquid level indicated by the numeral 26 to prevent the solution from overflowing the reservoir 10.

Reservoir 10 is coupled via line 28 through one output of the three way solenoid actuated valve 30 to the mixing tank 12 by line 32 and pump 34, a second output of valve 30 being the return line 36 which is also coupled with the mixing tank 12. Mixing tank 12 also has an overflow line 38 coupled therewith, above its associated upper liquid level indicated by the broken line 40. A source of water (not shown) is delivered by line 42 to the solenoid actuated two way valve 44 and input line 46 to the mixing tank 12. Another input line 48 to the mixing tank 12 is coupled via one output of the solenoid actuated three way valve 50, line 52, pump 54, to the output line 56 coupled with concentrate supply tank 14. A second output of valve 50 is returned by line 58 to tank 14. A manually operable drain valve is coupled by line 62 to the output line 56 to allow draining of the tank 14 by way of a drain means 64. Alternatively, valve 60 may be connected to a bulk storage container 66 by line 68 for use in delivering concentrate to the mixing tank 12 in lieu of the supply tank 14.

Turning attention now to the electrical circuit control system which forms an important part of the invention and which includes the control system panel 16, the double pole, single throw switch 70 is provided for coupling power from a suitable electrical power source 72 to the supply lines 74 and 76, there being further provided an indicator light 78 to alert personnel that the circuitry is receiving energizing power. Control system panel 16 comprises several functional circuit sections, including sensing circuit 80 operably associated with reservoir 10, relay circuit 82, relay latching circuit 84, timing relay circuit 86, sensing circuit 88 operably associated with the mixing tank 12, latching relay circuit 90 and sensing circuit 92 associated with the concentrate supply tank 14.

During normal operation of the system, switches 70, 93, 94 and 96 will be in their closed positions, whereby electrical power received by the circuitry on lines 74 and 76 is respectively delivered to motors 98, 100 and 102 by the parallel branch lines 104, 106 and 108 thereby energizing the corresponding fluid pumps 18, 34 and 54. Reservoir 10 is provided with sensing means 118 which includes a sensing probe 120 connected to the ground 122 by line 124 and common line 126; lower level sensing probe 128 which is connected by line 130 through switch 132 and line 134 to terminal 136 of the sensing circuit 80, the common terminal 138 thereof being connected by line 140 to the ground 122. Sensing means 118 also includes an upper level sensing probe 142 which is connected by line 144 to the switch 132. Similarly, mixing tank 12 is provided with sensing means 146 which includes a common probe 148 connected by line 150 to the common line 126; lower level sensing probe 152 which is connected by line 154 to terminal 156 of sensing circuit 88; and, an upper level sensing probe 158 which is connected by line 160 to terminal 162 of sensing circuit 88, a third input terminal 164 of the sensing circuit 88 being connected by line 166 to the ground 122. A third sensing means 168 is operably associated with the concentrate supply tank 14 and includes a common probe 170 connected by line 172 to the ground 122, and further includes a lower level sensing probe 174 which is operably connected by line 176 to terminal 178 of sensing circuit 92, a second input terminal 180 being operably connected to the ground 122 by means of line 182. Each of the above mentioned sensing means are preferably of the type having probes including circuit means for detecting changes in electrical resistance in response to contact with a sensed liquid to produce an electrical output signal indicative of a sensed condition.

Further description of the electrical control circuitry may now best be conveyed in conjunction with an explanation of the operation of the entire process control system. Assuming first that switches 70, 92, 94, and 96 are in their closed positions, electrical power received by the circuitry on lines 74 and 76 is respectively delivered to motors 98, 100, and 102 by parallel branch lines 104, 106, and 108 thereby energizing the corresponding fluid pumps 18, 34, and 54. Assume further now that the system is in equilibrium such that solenoid 110 is deenergized whereby to cause valve 30 to place line 32 in communication with return line 36, with solenoid 112 also deenergized whereby to cause valve 50 to place line 52 in communication with return line 58. With the circuitry in the condition mentioned above, pump 18 is operative to pump fountain solution from the reservoir 10 via line 114 to dampening means (not shown) through lines 116 and 20, with the excess, unused solution being returned to the reservoir 10 by line 22, so that pump 18 functions to continuously circulate fountain solution between the reservoir 10 and the mentioned dampening means.

Mixing tank 12 is adapted to receive specific quantities of a chemical concentrate from either the concentrate supply tank 14 or, alternatively, from a bulk storage source 66, as well as water from a source thereof (not shown) which is connected to line 42. The concentrate and water are delivered in the proper ratios, as will be discussed later, until the fountain solution reaches the level 40, and a batch of the newly mixed solution corresponding to the quantity of the solution within the tank 12 between levels 40 and 210 therein is selectively transferred to the reservoir 10. Turning attention more particularly now to the chemical concentrate tank 14, the tank 14 may be filled with a chemical concentrate from a source thereof either manually, by an operator, or automatically by additional apparatus (not shown). Sufficient concentrate is added to bring the level thereof above the low level 216 and preferably up to the upper level 218. When concentrate within the tank 14 is not being transferred to the mixing tank 12, valve 50 is conditioned such that output line 56 is coupled with the return line 58, and the energized pump 54 then functions to constantly recirculate the concentrate within the tank 14 to keep the same in a thoroughly mixed, readied condition. When a sufficient quantity of the concentrate has been depleted from the tank 14 and the concentrate level drops below level 216, sensing probe 174 detects such condition and delivers a signal via line 176 to input terminal 178 of sensing circuit 92, whereupon contacts 226 are switched from their normally open to a closed position and normally closed contacts 228 are switched to an open position. With contacts 226 and 228 in their switched condition, electrical supply line 200 is coupled through closed contacts 226 and line 230 to one side of bell 222 and light 224 which form alarm means 220, as well as to one side of light 225. The opposite side of light 224 and light 225 is normally coupled by line 232 to the other supply line 196, while the opposite side of bell 222 is also coupled by line 234 through the normally closed contacts 236 to supply line 196, thus, bell 222, light 224, and light 225 are energized to alert operating personnel that further concentrate should be added to the tank 14. Relay latching circuit 90 includes a coil 238 which is normally energized, but is deenergized when the contacts 228 are opened. In order to disable bell 222 a momentary action, reset switch 240 is provided to energize a second coil 242 associated with the relay latching circuit 90 which causes relay contacts 236 to open and thereby remove power from the bell 222. When tank 14 is refilled and the concentrate level therein rises above the level of sensing probe 174, a resert signal is delivered to the terminal 178 causing the sensing circuit to switch contacts 226 and 228 back to their normal condition, and resulting in coil 238 being reenergized to closed contacts 236 and further causing power to be removed from the light 224 and light 225.

Assuming now that an adequate supply of concentrate is present in the tank 14, and further assuming that a batch of the fountain solution has just been transferred from the mixing tank 12 to the reservoir 10 so that the level of fountain solution remaining in mixing tank 12 is slightly below the level 210, a new batch of the fountain solution is mixed in tank 12 in a sequence of events which will now be described. When the level of fountain solution drops below level 210, sensing probe 152 detects such condition and delivers a signal on line 154 to input terminal 156 of sensing circuit 88 which in turn closes the normally open contacts 214. Upon closure of contacts 214, supply line 200 is connected by lines 244, 246 and 248 to one side of the coil 250 associated with the timing relay circuit 86, the other side of coil 250 being connected to supply line 196. Timing relay circuit 86 comprises a portion of a commonly available time controlled relay device which includes timing means generally indicated by the numeral 274 for controlling the operation of the relay components for preselected time intervals. Preferably, the time controlled relay device will be of the type which includes a manually operable, graduated means 276 for selecting any of a plurality of time periods during which the associated electrical relay components are operated. Returning now to the operational description, with coil 250 energized, its associated normally open contacts 252 are closed and a solenoid energizing circuit is completed traceable from lines 246 and 254, closed contacts 252, line 256 to one side of solenoid 112, the other side thereof being connected to supply line 208. Power present on line 256 is also effective to energize the light 258 which alerts operating personnel that solenoid 112 is energized whereby valve 50 is actuated to change the concentrate flow from a recirculating mode to a transfer mode, that is, the flow path of concentrate in line 52 is diverted from line 58 and is directed through line 48 for delivery into the mixing tank 12. Also, upon closure of sensing circuit contacts 214, power is delivered to relay circuit 82 and relay latching circuit 84 as follows:

power on line 246 is delivered by line 192 to one side of coil 212 of circuit 84, the other side of same being connected to the supply line 196 by line 260, while power on line 246 is also delivered to one side of coil 262 associated with circuit 82, the other side of same being connected by line 194 to supply line 196. With power now present on line 246, current is delivered via line 64 to light 266 and one side of solenoid 268, the other side of the latter being connected by line 270 to supply line 208. Upon energization of solenoid 268, valve 44 is actuated to place water supply line 42 in communication with line 46 to permit delivery of water to the mixing tank 12, with the energization of light 266 alerting operating personnel that water is being received within the tank 12.

Solenoid 112 remains energized, to continue the transfer of concentrate from tank 14 to tank 12, for a period corresponding to the preselected time interval which coil 250 remains energized. When the timing means 274 "times out," coil 250 is deenergized, contacts 252 resume their normally open position and solenoid 112 is deenergized to actuate valve 50, resulting in the termination of flow of concentrate into tank 12 and returning the concentrate flow from the transfer mode to the recirculating mode. Timing means 274 is reset for subsequent operation upon contacts 214 resuming their normally open position. Pump 54, being of a type whose pumping output is of a constant, known rate, it can be appreciated that the quantity of concentrate transferred to tank 12 is readily correlatable with the time interval in which the solenoid 112 remains energized, and thus the quantity of concentrate mixed in each batch within tank 12 can be regulated with a high degree of precision through the use of timing means 274 and manually operable time period selection means 276 associated with the timing relay circuit 86.

After the preselected quantity of concentrate has been transferred to tank 12 and coil 250 is deenergized, solenoid 268 remains energized to permit the flow of water into tank 12 to continue, by virtue of the fact that contacts 214 remain closed and thus, line 264 associated with solenoid 268 remains connected through lines 246 and 244 to supply line 200. Consequently, water continues to be added to tank 12, after the prescribed quantity of concentrate has been added thereto, until the total quantity of solution in tank 12 reaches the upper level 40. When the solution reaches level 40, probe 154 delivers a signal on line 160 to input terminal 162 of sensing circuit 88, causing contacts 214 to return to their normally open position, and in turn deenergizing lines 246 and 264, along with solenoid 268 to actuate valve 44 and terminate the flow of water into the tank 12. The quantity of water which has been added to tank 12 is precisely measured and is readily ascertained by calculating the product of the uniform cross-section of the tank 12 times the height between levels 40 and 210. Therefore, with the quantity of water delivered to tank 12 precisely known, a preselected quantity of the concentrate is added from the tank 14 to mix a batch of the fountain solution in tank 12 whose mixture comprises a preselected ratio of concentrate to water. At this point, with a newly mixed batch of fountain solution in tank 12, the pump 34 remains operative to pump the solution from line 32 back to the tank 12 through a return line 36 in a recirculating fashion, in order to maintain the solution in a thoroughly mixed condition until such time as the batch is transferred to reservoir 10 in order to replenish the latter.

As the fountain solution is recirculated between the dampening means associated with a printing press and the reservoir 10, the solution is gradually consumed by the dampening operation and the level of fountain solution remaining in reservoir 10 eventually drops below the liquid level indicated by the broken line 184, and thus below the level of the lower probe 128 of sensing means 118. Assuming now that a batch of fountain solution has been mixed in mixing tank 12 in the manner described previously and is ready for transfer to reservoir 10, when the level of fountain solution within reservoir 10 drops below probe 128, a change in electrical resistance is detected by the latter, which change is detected by sensing circuit 80, and upon the detection of such change sensing circuit 80 is operative to energize the solenoid 110 thereby actuating valve 30 as follows: upon receipt at terminal 136 of a signal initiated at probe 128, the normally open contacts 186 associated with sensing circuit 80 are closed, thus coupling electrical supply line 76 in series with the coil 188 associated with the relay latching circuit 84 through the normally closed contacts 190 of relay circuit 82, the other side of coil 188 being connected by lines 192, 194, and 196 to the other electrical supply line 74. With coil 188 energized, the normally open contacts 198 associated with relay latching circuit 84 are closed, thus coupling supply line 76 and branch lines 200 and 202 with line 204 which later line comprises one electrical imput to the solenoid 110, a second electrical input to solenoid 110 being formed by the line 206 which is in turn connected by line 208 to the second electrical supply line 74. With solenoid 110 energized, valve 30 is actuated to place line 32 in communication with line 28 so that an already mixed batch of the fountain solution residing in tank 12 is pumped by means of pump 34 from line 32 through line 28 into the reservoir 10. Operating personnel are alerted that the solution transfer is taking place by virtue of the light 272 being energized when power is delivered through line 204 upon closure of contacts 198.

In the event that a batch of fountain solution is not yet ready for transfer from tank 12 to reservoir 10 at the point in time where the solution in reservoir 10 drops below level 184, that is, if tank 12 is still in a state of being filled, valve 30 remains in its recirculating position and transfer of the fountain solution to the reservoir 10 is delayed due to the employment of relay circuit 82; this operating feature becomes evident by recalling that the contacts 214 of sensing circuit 88 are closed during the filling of tank 12, so that power is delivered to coil 262 of relay circuit 82, thereby opening the normally closed contacts 190. With the contacts 190 opened, coil 188 can not be energized and thus, contacts 198 remain open and solenoid 110 is deprived of energizing power. When the filling of tank 12 is complete, contacts 214 return to their open state, coil 262 is deenergized, and contacts 190 return to their normally closed state to permit the control system to effect the transfer of the fountain solution to reservoir 10. Assuming now, that a batch of fountain solution is being transferred from tank 12 to reservoir 10, when the level of fountain solution in reservoir 10 rises above the level 184, probe 128 causes contacts 186 to return to their normally open position, however solenoid 110 remains energized to continue solution transfer into reservoir 10 due to the fact that contacts 198 are latched in a closed position. When, during the transfer of solution to the reservoir 10 from tank 12, the solution in tank 12 drops below probe 152, contacts 214 are closed to energize coil 212 of latching relay circuit 84, whereupon contacts 198 are opened and the power circuit to solenoid 110 is opened resulting in the valve 30 being switched to return the flow of solution from a transfer to a recirculating mode. When the transfer of a batch of solution to the reservoir 10 has been completed, a new batch of the fountain solution is then mixed in mixing tank 12 in accordance with the sequence previously described.

From the foregoing, it is apparent that the invention provides particularly simple but high reliable means for controlling the mixing and delivery of fountain solution to printing press apparatus, in contrast to prior art devices which were essentially mechanical in their operation and were less than completely satisfactory in terms of reliability and accuracy. Thus, it will be observed that my improved apparatus not only provides for the reliable accomplishment of the objects of the invention, but does so in a particularly simple and efficient manner. It is recognized, of course, that those skilled in the art may make various modifications or additions to the preferred embodiment chosen to illustrate the invention without departing from the gist and essence of my contribution to the art. Accordingly, it is to be understood that the protection sought and to be afforded hereby should be deemed to extend to the subject matter claimed and all equivalents thereof fairly within the scope of the invention.

Having thus described the invention, what is claimed as new and desired to be secured by Letters Patent is:

1. A system for mixing a primary liquid in a preselected ratio with a secondary liquid to produce a batch of a solution, including:

a container adapted to hold said solution batch therein;

first actuatable valve means operably coupled with said container and adapted to be operably coupled with a source of said primary liquid, said first valve means being selectively actuatable to place said container in communication with said source of said primary liquid;

second actuatable valve means operably coupled with said container and adapted to be coupled with a source of said secondary liquid, said second valve means being selectively actuatable to place said container in communication with said source of said secondary liquid; and control means operably coupled with said first and second valve means for controlling the actuation of each of the latter, said control means including timing means for producing a time base correlatable with the flow of said primary liquid into said container, first electrical circuit means operably coupled with said timing means and responsive to the latter for selectively actuating said first valve means whereby to cause a correlated quantity of said primary liquid to be introduced into said container, means for sensing a quantity of said solution corresponding to said batch thereof within said container, and second electrical circuit means responsive to said sensing means for selectively actuating said second valve means whereby to cause said secondary liquid to be added to said correlated quantity of said primary liquid until the quantity of solution in said container corresponds to said batch thereof.

2. The invention of claim 1, wherein:
said timing means includes manually operable means for preselecting the time interval during which said first valve means is actuated whereby to allow preselection of the quantity of said primary liquid introduced into said container, and
said sensing means includes means for sensing a level of said solution within said container corresponding to said batch thereof.

3. The invention of claim 2, wherein said level sensing means comprises a probe element adapted to contact said solution within said container, and there is further provided:
an electrical sensing circuit operably coupled with said probe element,
said sensing circuit including electrical contacts operably coupled with said second electrical circuit means and switchable in response to the operation of said probe element for controlling said second electrical circuit means to actuate said second valve means.

4. The invention of claim 3, wherein said first valve means includes an electrically responsive device for actuating said valve means between an open and closed position, and said first electrical circuit means includes a relay circuit comprising:
a relay coil operably coupled between said electrical sensing circuit and said timing means, and
a pair of switchable electrical relay contacts controlled by said coil and operably coupled with said electrical sensing circuit and said electrically responsive device.

5. The invention of claim 2, wherein there is further provided:
pumping means for pumping said solution away from said container;
third selectively actuatable valve means operably coupled with said control means and having an input thereto selectively switchable into communication with either a first or second output thereof, said first output thereof being operably coupled with said container and said second output thereof being adapted for coupling with means for receiving said solution,
said pumping means including an input thereto operably coupled with said container and an output thereof operably coupled with said input of said third valve means,
said sensing means including first and second elements associated with said container and operatively coupled with control means for sensing the presence of said solution at corresponding upper and lower levels therein,
said control system being operative in response to the sensing of the presence of said solution at said upper level by said first sensing element, to actuate said third valve means for placing the latter's said input in communication with its said second output whereby said pumping means pumps said solution away from said container to said receiving means,
said control system being further operative in response to the sensing of the absence of said solution at said lower level by said second sensing element, to actuate said third valve means for placing the latter's said input in communication with its said first output whereby said pumping means pumps said solution away from and back into said container in a recirculating manner.

6. Apparatus for mixing a primary liquid in a preselected ratio with a secondary liquid to produce a batch of mixed liquid, including:
a container adapted to hold said batch of mixed liquid;
first and second electrically responsive valve means each actuatable between an open and a closed condition, and being operably coupled with said container and adapted for respectively operably coupling with a source of said primary liquid and a source of said secondary liquid;
electrical control means for selectively actuating said first and second valve means to allow introduction of said primary and said secondary liquids into said container in said preselected ratio to each other whereby to produce said batch, said control means comprising
timing circuit means operably connected with said first valve means for actuating the latter a preselected time period to allow introduction of a time measured quantity of said primary liquid into said container, and
sensing means associated with said container for sensing a level of said mixed liquid within the latter corresponding to said batch thereof, said sensing means cooperating with said timing circuit means and being operably coupled with said second valve means for actuating the latter to allow introduction of said secondary liquid into said container until said level is sensed.

7. The invention of claim 6, wherein:
said timing circuit means includes manually operable means for preselecting said time periods,
said timing circuit means further including a switching circuit operably coupled with said first valve means and under control of said timing circuit means, for selectively coupling energizing electrical power with said first valve means to actuate the latter,
said sensing means including a sensing element mounted for contact with said mixed liquid and having an electrical resistance whose magnitude changes upon contact with said mixed liquid,
said sensing means further including
first switching circuit means having means for detecting said change in electrical resistance in said sensing element and being operatively coupled with said sensing element and under control of the latter, and
second switching circuit means operatively coupled with said first valve means and said first switching circuit means,
said first switching circuit means functioning to energize said second switching circuit means when said detecting means detects said resistance change,
said second switching circuit means being operative, upon energization thereof by said first switching circuit means to couple said first valve means with a source of electrical power whereby to actuate the latter.

8. The invention of claim 7, including:
a reservoir adapted to hold a quantity of said primary liquid;
means for pumping said primary liquid away from said reservoir into said container, said pumping means being operably coupled between said reservoir and an input to said first valve means; and alarm means for detecting and announcing a low level of said primary liquid within said reservoir, said alarm means comprising a sensing element associated with said reservoir for sensing the absence of said primary liquid at a prescribed level therewithin first and second electrically energizable alarm means, first switchable circuit means operably coupled with said first alarm means and said sensing element, and controlled by the latter and being adapted for coupling with a source of electrical power, second switchable circuit means operably coupled with said first switchable circuit means and being adapted for normally coupling with a source of energizing electrical power, said second switchable circuit means having a first condition in which said second alarm means is coupled therewith, but being actuatable to a second condition in which said second alarm means is uncoupled therefrom, said first switchable circuit means being responsive to said sensing element for coupling said electrical power source with said first and second alarm means whereby to energize each of the latter when said absence of said primary liquid in sensed, and for uncoupling said electrical power source from said second switchable circuit means whereby to deenergize the latter, and switch means operably coupled with said electrical power source and said second switchable circuit means for actuating the latter from its said first condition to its said second condition whereby to deenergize said second alarm means and reset the latter for announcing a subsequent low level of said primary liquid, said first switchable circuit means functioning to uncouple said electrical power source from said first alarm means whereby to deenergize the latter when said sensing element senses the presence of said primary liquid at said prescribed level.

9. Apparatus for mixing a primary liquid with a secondary liquid to produce successive batches of a liquid formulation for replenishing a reservoir of the latter, including:

a mixing container adapted to receive quantities of said primary and secondary liquids therein for mixing;

first and second actuatable valve means operably connected with said mixing container and adapted for respectively operably coupling with sources of said primary and secondary liquids;

a reservoir adapted to hold said liquid formulation therein;

a third actuatable valve means operably coupled between said mixing container and said reservoir for selectively allowing transfer of said batches from said mixing container to said reservoir whereby to replenish the latter as said formulation is depleted through use from said reservoir;

control means for controlling the transfer of said batches to said reservoir, said control means being operatively connected to said third valve means for controlling the latter and including means associated with said reservoir for sensing the depletion of a quantity of said formulation from said reservoir, said control being operative to actuate said third valve means to allow transfer of a batch of said formulation to said reservoir when said sensing means senses the depletion of said quantity of said formulation from said reservoir;

said first and second valve means being operably connected with said control means and under control of the latter, said control means functioning to selectively actuate said first and second valve means to allow introduction of respective prescribed quantities of said primary and secondary liquids to said mixing container;

timing means for controlling the quantity of said primary liquid mixed with said secondary liquid including means for producing a time base correlatable with the quantity of primary liquid introduced through said first valve means into said mixing container; and means associated with said mixing container for sensing the total quantity of said primary and said secondary liquids in said container corresponding to said batch, said control means functioning to actuate said first valve means to allow introduction of a correlated quantity of said primary liquid into said mixing container, and further functioning to actuate said second valve means to allow introduction of said secondary liquid into said mixing container until said liquid quantity corresponding to said batch is sensed by said sensing means.

10. The invention of claim 9, wherein:

said depletion sensing means includes a sensing element for sensing said formulation at a low level within said reservoir, and said batch sensing means associated with said mixing container includes a first and second sensing element for sensing said liquids at respective upper and lower levels within said mixing container, said control means further including first electrical circuit means operably coupled with said batch sensing means and under control of the latter, second electrical circuit means operably coupled with said timing circuit means, said first circuit means, and said first valve means for actuating the latter, third electrical circuit means operably coupled with said first circuit means, said second valve means, and said third valve means for actuating each of said latter valve means, fourth electrical circuit means operably coupled with said depletion sensing means and under control of the latter, and being further operably coupled with said third circuit means, said first circuit means being operable in response to the sensing of the absence of said liquids at said lower level in said mixing container, to condition said second circuit means whereby the latter is caused to actuate said first valve means to permit introduction of said primary liquid into said mixing container, and to condition said third circuit means whereby the latter is caused to actuate said second valve means to permit introduction of said secondary liquid into said mixing container for mixing with said primary liquid therein, said timing means operably cooperating with said second circuit means when said correlated quantity of said primary liquid has been introduced into said mixing container to cause said second circuit means to actuate said first valve means whereby to terminate introduction of said primary liquid into said mixing container, said third circuit means being operable in response to the sensing of the presence of said liquids at said upper level in said mixing container, to actuate said second valve means whereby to terminate introduction of said secondary liquid into said mixing container, said fourth circuit means being operable in response to the sensing of the absence of said formulation at said low level in said reservoir, to condition said third circuit means whereby to cause the latter to actuate said third valve means for allowing the transfer of a batch of said formulation from said mixing container to said reservoir.

11. The invention of claim 10, wherein said timing means includes manually operable means operatively connected with said time base for preselecting the time interval during which said first valve means is actuated to allow introduction of said correlated quantity of said primary liquid into said mixing container.

12. The invention of claim 10, wherein there is further provided fifth electrical circuit means operably coupled with said first, said third and said fourth circuit means, for preventing said fourth circuit means from operating to condition said third circuit means whereby to cause the latter to actuate said third valve means to effect said transfer, until said first sensing element of said batch sensing means senses the presence of said liquids at said upper level.

13. The invention of claim 10, wherein there is further provided:
tank means adapted to hold a quantity of said primary liquid therein;
said tank means being operatively coupled with said first valve means whereby to provide said source of said primary liquid for introduction to said mixing tank;
sensing means associated with said tank means for sensing a low level of said primary liquid therein; and
alarm circuit means operably coupled with said sensing means and responsive to the latter to announce an alarm condition when a low level of said primary liquid in said tank means is sensed by said sensing means.

14. The invention of claim 10, wherein said third valve means includes a pair of outputs and an input selectively actuatable into communication with either of said outputs, one of said outputs being in communication with said reservoir and the other of said outputs being in communication with said mixing tank, there being further provided means operably coupled between said imput to said third valve means and said mixing container for pumping said formulation from said mixing container to said third valve means, said third valve means being actuatable to a first condition in which said formulation is pumped through said one output for transfering a batch of said formulation to said reservoir and actuatable to a second condition in which said formulation is pumped through said other output to return said formulation to said mixing container whereby to provide recirculation of said formulation.

15. The invention of claim 10, wherein:
said first circuit means includes a pair of electrical contacts switchable in response to the operation of said batch sensing means and being adapted for coupling with an electrical power source, and operative to couple the latter with said second circuit means, said third circuit means, and said second valve means, and
said second circuit means comprises a pair of switchable electrical contacts connected with said contacts of said first circuit means and with said first valve means, and further comprising an electrically energizable element for switching said contacts of said second circuit means, said energizable element being operative in response to the switching of said contacts of said first circuit means to switch said contacts of said second circuit means whereby to actuate said first valve means.

16. The invention of claim 15, wherein:
said timing means is operably coupled with said energizable element of said second circuit means and functions to control the operation of said energizable element, and
said fourth circuit means includes a pair of electrical contacts switchable in response to the operation of said depletion sensing means, and being adapted for coupling with a source of electrical power and operative to couple the latter with said third circuit means,
said third circuit means further comprising a pair of switchable electrical contacts operably coupled with a source of electrical power and with said third valve means, and an electrically energizable element operably coupled with said contacts of said fourth circuit means and operative in response to switching of the latter to switch said contacts of said third circuit means whereby to actuate said third valve means.

17. A system for mixing a quantity of a first liquid in a preselected ration to a quantity of a second liquid to produce successive batches of a solution, and for supplying said solution to apparatus for use in connection therewith, including:
a reservoir adapted to hold a quantity of said solution therein, and being further adapted for operably coupling with said apparatus for supplying the latter with said solution;
first sensing means associated with said reservoir for sensing the depletion of said solution below a prescribed level within said reservoir;
a container for receiving said quantities of said first and second liquids therein to mix one of said batches;
first valve means operably coupled with said reservoir and said container, and being controllable from an open position in which said reservoir is placed in communication with said container to a closed position in which said reservoir is removed from communication with said container;
second sensing means associated with said container for sensing said liquids at a first and second level therein, the quantity of said liquids between said first and second levels corresponding to one of said batches;

a tank adapted for holding a quantity of said first liquid therein;

second valve means operably coupled with said tank and said container and being controllable from an open position wherein said tank is placed in communication with said container to a closed position in which said tank is removed from communication with said container;

third valve means operably coupled with said tank and adapted to be coupled with a source of said second liquid, and being controllable from an open position in which said source is placed in communication with said container to a closed position in which said source is removed from communication with said container;

control means operably coupled with said first and second sensing means, and said first, second and third valve means, said control means being operable to control said second and third valve means to permit introduction of said quantities of said first and second liquids in said preselected ratio into said container whereby to mix one of said batches, said control means being further operable in response to the sensing of the depletion of said solution below said prescribed level in said reservoir by said first sensing means to control said first valve means to permit transfer of a batch of said solution from said container to said reservoir, said control means comprising first electrical circuit means operably coupled with said first sensing means and said first valve means for controlling the latter to its said open position to effect said transfer of said batch, second electrical circuit means operably coupled with said second sensing means and said first valve means for controlling the latter to its said closed position after said batch has been transferred to said reservoir, and third electrical circuit means operably coupled with said second circuit means and with said second valve means, and being operative in response to the sensing of said liquids at said second level in said container by said second sensing means, to control said second valve means to its said open position whereby to allow introduction of said quantity of said first liquid into said container and to control said third valve means to its said open position whereby to allow introduction of said quantity of said second liquid into said container for mixing with said quantity of said first liquid to produce one of said batches of said solution;

said third circuit means including timing means comprising:

means for producing a time base correlatable with the quantity of said first liquid introduced into said container, and switchable circuit means operably coupled with said second valve means and said time base producing means and responsive to the latter to control said second valve means to its said closed position when a correlated quantity of said first liquid has been introduced into said container.

18. A method for combining a primary liquid in a preselected ratio with a secondary liquid to produce a quantity of a solution corresponding to a batch thereof, comprising the steps of:

producing a time base;

correlating said time base with a quantity of said primary liquid;

introducing a correlated quantity of said primary liquid to a container adapted to hold said batch;

correlating a quantity of said secondary liquid with said quantity of solution;

correlating the volume of said quantity of said solution with the volume of said quantity of secondary liquid; and introducing a correlated quantity of said secondary liquid to said container for mixing with said correlated quantity of said primary liquid whereby to produce said batch.

19. A method for mixing a primary liquid in a prescribed ratio with a secondary liquid to produce successive batches of a liquid formulation, and for replenishing a reservoir of said formulation from which the latter is dispensed for use, comprising the steps of, producing a time base;

correlating said time base with a quantity of said primary liquid;

introducing a correlated quantity of said primary liquid to a container adapted to hold at least one of said batches;

correlating a quantity of said secondary liquid with a quantity of said formulation corresponding to said batch;

introducing a correlated quantity of secondary liquid to said container for mixing with said correlated quantity of said primary liquid whereby to produce said batch;

sensing the depletion of a prescribed quantity of said formulation from said reservoir;

transferring a batch of said formulation from said container to said reservoir whereby to replenish the latter when said prescribed quantity of said formulation has been sensed, the step of correlating said time base including the step of associating the rate of flow of said primary liquid into said container with said time base, the step of introducing a correlated quantity of said primary liquid including the step of measuring the time interval during which said primary liquid flows into said container whereby to determine said correlated quantity of said primary liquid introduced into said container;

the step of correlating a quantity of said secondary liquid including the step of associating said quantity of said secondary liquid with a level of said formulation in said container corresponding to a batch thereof, and the step of introducing a correlated quantity of said secondary liquid including the step of sensing the level of said formulation in said container corresponding to said level associated with batch.

20. The invention of claim 19, wherein the step of transferring a batch of said formulation is performed after the steps of introducing correlated quantities of said primary and secondary liquids have been performed.

* * * * *